(12) United States Patent
Kim et al.

(10) Patent No.: US 11,166,302 B2
(45) Date of Patent: Nov. 2, 2021

(54) METHOD AND APPARATUS FOR TRANSMITTING AND RECEIVING SCHEDULING REQUEST

(71) Applicant: Samsung Electronics Co., Ltd., Suwon-si (KR)

(72) Inventors: Sang-Bum Kim, Suwon-si (KR); Soeng-Hun Kim, Suwon-si (KR); Jae-Hyuk Jang, Suwon-si (KR); Himke Van Der Velde, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 15/350,853

(22) Filed: Nov. 14, 2016

(65) Prior Publication Data

US 2017/0142749 A1     May 18, 2017

Related U.S. Application Data

(60) Provisional application No. 62/255,682, filed on Nov. 16, 2015.

(51) Int. Cl.
*H04W 72/12*     (2009.01)
*H04W 76/38*     (2018.01)
*H04W 76/27*     (2018.01)

(52) U.S. Cl.
CPC ....... *H04W 72/1289* (2013.01); *H04W 76/27* (2018.02); *H04W 76/38* (2018.02)

(58) Field of Classification Search
CPC ......... H04W 72/1284; H04W 72/0413; H04W 76/046; H04W 72/1268
See application file for complete search history.

(56) References Cited

U.S. PATENT DOCUMENTS

2012/0100864 A1    4/2012   Susitaival et al.
2013/0235768 A1    9/2013   Earnshaw et al.
(Continued)

FOREIGN PATENT DOCUMENTS

CN     101938841 A    1/2011
CN     102474880 A    5/2012
(Continued)

OTHER PUBLICATIONS

Indoor navigation by infsoft—learn more about our indoor navigation solutions, http://www.infsoft.com/Products/Indoor-Navigation, 2015.
(Continued)

*Primary Examiner* — Asad M Nawaz
*Assistant Examiner* — Najeeb Ansari
(74) *Attorney, Agent, or Firm* — Jefferson IP Law, LLP

(57) ABSTRACT

The present disclosure relates to communication schemes for combining 5G communication systems with IoT technology to support higher data transmission rate as post-4G systems and systems for the same. The present disclosure may be used in intelligent services (e.g., smart home, smart building, smart city, smart car, or connected car, health-care, digital education, retail business, security and safety-related services, etc.) based on the 5G communication technology and IoT-related techniques. Disclosed is a method for transmitting a scheduling request (SR) by a user equipment (UE) in a cellular communication system. The transmitting method may comprises receiving configuration information related to transmission of the SR from an enhanced node B (eNB), determining a value of a timer for prohibiting an SR transmission based on the received configuration information, and transmitting a set of SRs, wherein the timer may start at the time of transmission of a first SR of the SR set.

17 Claims, 14 Drawing Sheets

(56) References Cited

U.S. PATENT DOCUMENTS

| | | | |
|---|---|---|---|
| 2014/0036885 A1 | 2/2014 | Moberg et al. | |
| 2014/0293898 A1 | 10/2014 | Tseng | |
| 2015/0049697 A1 | 2/2015 | Worrall et al. | |
| 2015/0319643 A1 | 11/2015 | Zhu et al. | |
| 2016/0057767 A1* | 2/2016 | Kim | H04W 24/10 |
| | | | 370/329 |
| 2016/0157256 A1* | 6/2016 | Tseng | H04W 72/1284 |
| | | | 370/329 |
| 2016/0270114 A1* | 9/2016 | Dinan | H04L 5/0053 |
| 2016/0278124 A1 | 9/2016 | Zhao | |
| 2016/0366681 A1* | 12/2016 | Dinan | H04L 5/00 |
| 2017/0289908 A1* | 10/2017 | Lee | H04W 52/0219 |
| 2017/0290028 A1* | 10/2017 | Lee | H04W 72/1278 |
| 2018/0013533 A1* | 1/2018 | Yang | H04W 72/0413 |
| 2018/0139764 A1* | 5/2018 | Hwang | H04L 1/18 |

FOREIGN PATENT DOCUMENTS

| CN | 104170508 A | 11/2014 |
|---|---|---|
| WO | 2015/020478 A1 | 2/2015 |
| WO | 2015/062470 A1 | 5/2015 |

OTHER PUBLICATIONS

Samsung, SR handling in Rel-13 Enhanced Coverage MTC, R2-156815, 3GPP TSG-RAN WG2 Meeting #92, Anaheim, USA, Nov. 7, 2015.
Huawei et al., "Unicast TransmissionReception Issues for Rel-13 MTC", 3GPP Draft, R2-154359, 3rd Generation Partnership Project (3GPP), vol. RAN WG2, Oct. 4, 2015, XP51004888, Malmo, Sweden.
Ericsson, "Remaining user plane issues for Rel-13 LC and CE UEs", 3GPP Draft, R2-156776, 3rd Generation Partnership Project (3GPP), vol. RAN WG2, Nov. 7, 2015, XP51024929, Anaheim, USA.
LG Electronics, "Details on SR, SRS, and SPS transmission for MTC UE", 3GPP Draft, R1-156848, 3rd Generation Partnership Project (3GPP), vol. RAN WG1, Nov. 15, 2015, XP51003204, Anaheim, USA.
Ericsson, "Email discussion report on [91bis#17][LTEMTC] Timers", 3GPP Draft, R2-156778, 3rd Generation Partnership Project (3GPP), vol. RAN WG2, Nov. 13, 2015, XP51025010, Anaheim, USA.
Chinese Office Action dated Oct. 10, 2020, issued in Chinese Application No. 201680066632.5.

\* cited by examiner

METHOD AND APPARATUS FOR TRANSMITTING AND RECEIVING SCHEDULING REQUEST

CROSS-REFERENCE TO RELATED APPLICATION(S)

This application claims the benefit under 35 U.S.C. § 119(e) of a US patent application filed in the United States Patent and Trademark Office on Nov. 16, 2015 and assigned Ser. No. 62/255,682, the entire disclosure of which is incorporated herein by reference.

TECHNICAL FIELD

The present disclosure relates to communication schemes for combining 5G communication systems with IoT technology to support higher data transmission rate as post-4G systems and systems for the same. The present disclosure may be used in intelligent services (e.g., smart home, smart building, smart city, smart car, or connected car, health-care, digital education, retail business, security and safety-related services, etc.) based on the 5G communication technology and IoT-related techniques.

DISCUSSION OF RELATED ART

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network as a Big data processing technique may be said to be an example of the convergence of the 5G and IoT technologies.

The above information is presented as background information only to assist with an understanding of the present disclosure. No determination has been made, and no assertion is made, as to whether any of the above might be applicable as prior art with regard to the present disclosure.

SUMMARY

According to an embodiment of the present disclosure, there are provided a method and apparatus for transmitting and receiving a scheduling request for ensuring transfer of the scheduling request even under a poor quality of transmission channel.

According to an embodiment of the present disclosure, a method for transmitting a scheduling request (SR) by a user equipment (UE) may comprises receiving configuration information related to transmission of the SR from an enhanced node B (eNB), determining a value of a timer for prohibiting an SR transmission based on the received configuration information, and transmitting a set of SRs, wherein the timer may start at the time of transmission of a first SR of the SR set.

According to an embodiment of the present disclosure, a method for receiving a scheduling request (SR) by an enhanced node B (eNB) may comprises transmitting configuration information related to transmission of the SR to a user equipment (UE), determining a value of a timer for prohibiting an SR transmission, and receiving a set of SRs, wherein the timer may start at the time of transmission of a first SR of the SR set.

As set forth above, according to the present disclosure, a scheduling request may be stably transferred even under a poor quality of transmission channel.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
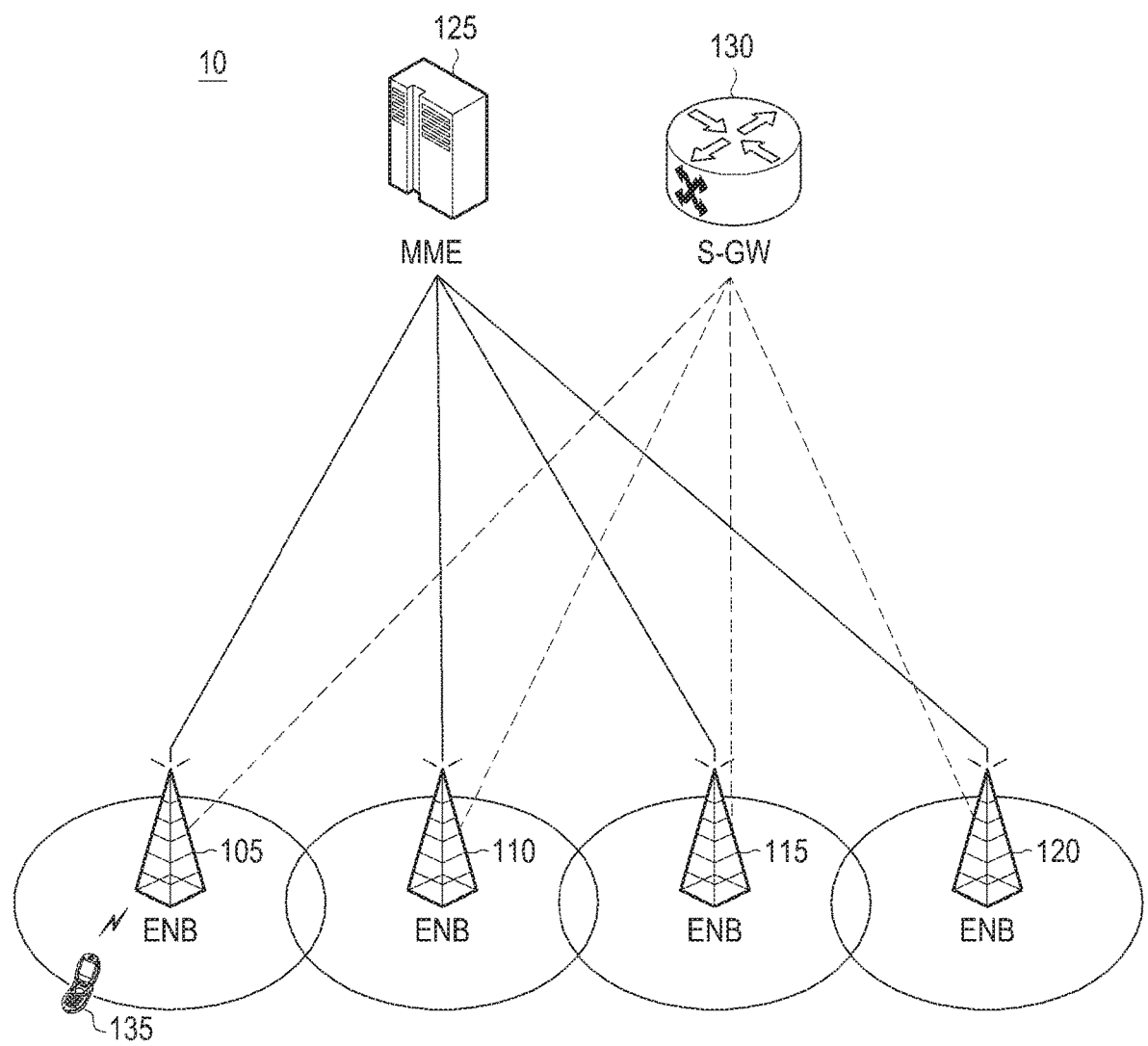
FIG. 1 is a view illustrating a configuration of a LTE system according to an embodiment of the present disclosure.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. The terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

When determined to make the subject matter of the present disclosure unclear, the detailed of the known functions or configurations may be skipped. Hereinafter, the present disclosure is described in detail with reference to the accompanying drawings.

FIG. 1 is a view illustrating a configuration of a long-term evolution (LTE) system according to an embodiment of the present disclosure.

Referring to FIG. 1, a radio access network of the LTE system 10 includes next-generation base stations (evolved node B—hereinafter, "eNB" or "base station") 105, 110, 115, and 120, a mobility management entity (MME) 125, and a serving gateway (S-GW) 130. Here, a user equip equipment (hereinafter, "UE" or "terminal") 135 may access an external network through the eNB 105 to 120 and the S-GW 130.

The eNBs 105 to 120 of FIG. 1 correspond to node Bs in the legacy universal mobile telecommunication system (UMTS) system. The eNBs 105 to 120 may be connected with the UE 135 through a wireless channel and may play a more complicated role than the legacy node B.

In the LTE system 10, e.g., user traffic by a real-time service, such as voice over internet protocol (VoIP), may be serviced through a shared channel. In this case, the eNBs 105 t 120 may perform scheduling by compiling state information, such as buffer state, available transmit power state, or channel state of the UE 135.

Further, at least one of the eNBs 105 to 120 may typically control multiple cells. For example, in order to embody a transmission rate of 100 Mbps, the eNBs 105 to 120 or the LTE system 10 may adopt, as a radio access technique, e.g., orthogonal frequency division multiplexing (OFDM) in a 20 MHz bandwidth. Further, the eNBs 105 to 120 or the LTE system 10 may adopt adaptive modulation & coding (AMC) that determines a modulation scheme and a channel coding rate in compliance with the channel state of the UE 10.

The S-GW 130 may provide a data bearer. The S-GW 130 may generate or remove a data bearer under the control of the MME 125. The MME 125 may be in charge of various control functions along with mobility management of the UE. In this case, the MME 125 may be connected with multiple eNBs.

Figure 2:
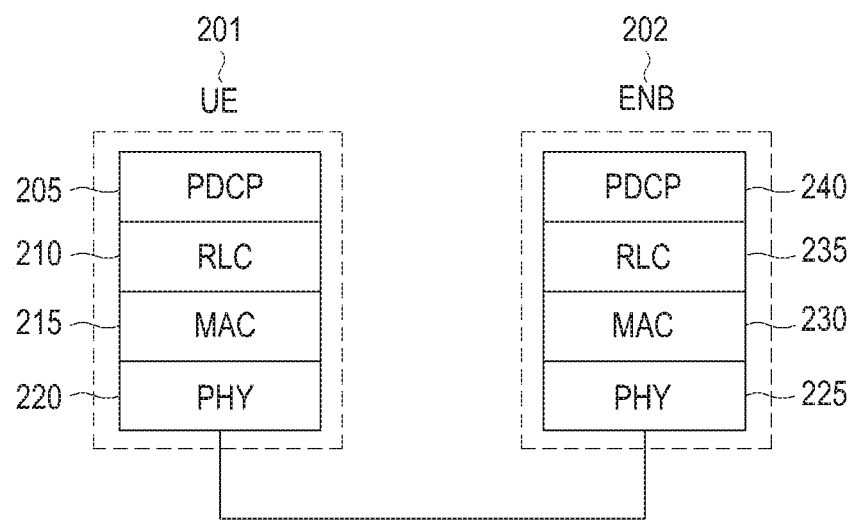
FIG. 2 is a view illustrating a structure of a wireless protocol according to an embodiment of the present disclosure.

FIG. 2 is a view illustrating a structure of a wireless protocol according to an embodiment of the present disclosure.

Referring to FIG. 2, wireless protocols of the LTE system 10, according to an embodiment of the present disclosure, may include packet data convergence protocols (PDCPs) 205 and 240, radio link controls (RLCs) 210 and 235, and medium access controls (MACs) 215 and 230 for the UE 201 and the eNB 202, respectively.

The PDCPs 205 and 240 may compress or restore the IP header.

The RLCs 210 and 235 may reconfigure packet data units (PDUs) into a proper size and perform ARQ operations.

The MACs 215 and 230 may be connected with a plurality of RLC layer devices included in the UE 201. Further, the MACs 215 and 230 may multiplex RLC PDUs into a MAC PDU and demultiplex the MAC PDU into RLC PDUs.

The physical layers 220 and 225 may channel-code and modulate higher-layer data. Further, the physical layers 220 and 225 may create higher layer data into OFDM symbols, transmit the OFDM symbols through a wireless channel, and demodulate the OFDM symbols received through the wireless channel. In this case, the physical layers 220 and 225 may channel-decode the demodulated OFDM symbols and transfer a result of the channel decoding to a higher layer.

Figure 3:
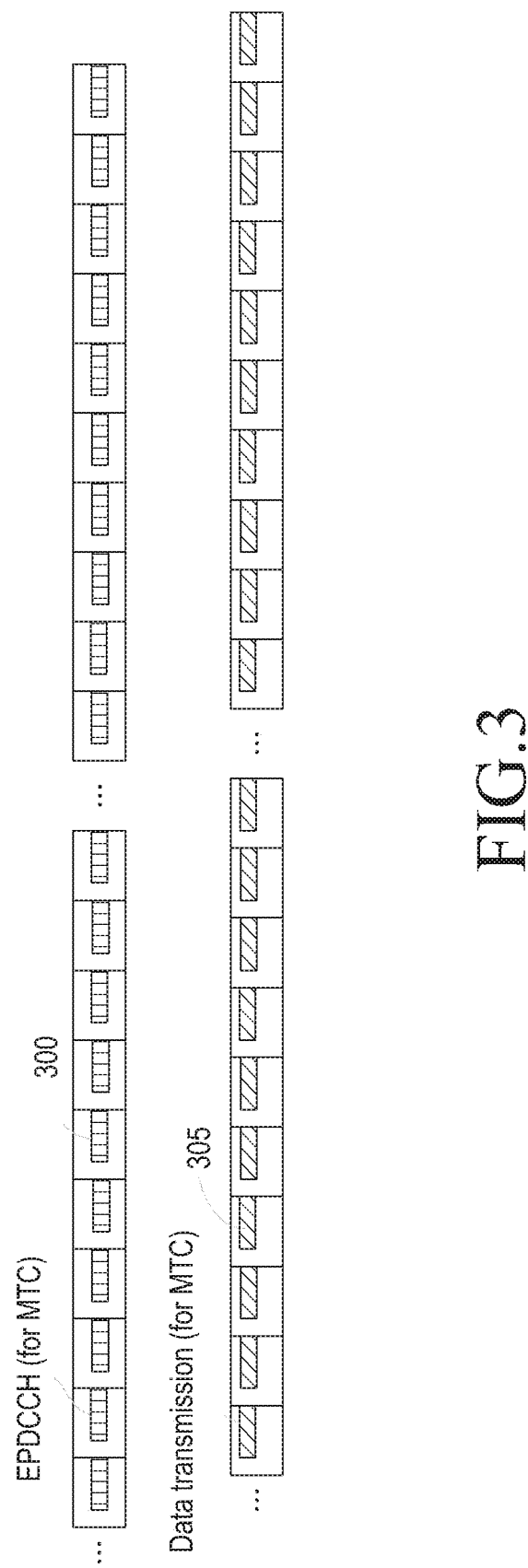
FIG. 3 is a view illustrating a method for transmitting an EPDCCH and data according to an embodiment of the present disclosure.

FIG. 3 is a view illustrating a method for transmitting an enhanced physical downlink control channel (EPDCCH) and data according to an embodiment of the present disclosure.

Referring to FIG. 3, at least one of an enhanced-physical downlink control channel and data may be communicated between the electronic devices. According to an embodiment of the present disclosure, the electronic devices may be machine-type communication devices. Here, the machine-type communication devices may be televisions, personal computers (PCs), refrigerators, microwave ovens, boilers, tablet PCs, smartphones, or other various electronic devices, or objects, such as desks, chairs, or closets equipped with an electronic device.

According to an embodiment of the present disclosure, enhanced-MTC (eMTC), release-13 (Rel-13) primarily features support of 1.4 MHz narrow bands and expansion of service coverage. In this case, the machine-type communication devices require expanded service coverage for various reasons, such as a deterioration of receive performance due to a single antenna and low-price receiver or installation off existing service coverage. To back up this, the eNB may repeatedly transmit various control signals and normal data for communication. The machine-type communication devices soft-combine the signals repeatedly transmitted to allow for reception of desired signals even far away from the existing service coverage.

For example, referring to FIG. 3, the machine-type communication device may repeatedly receive an EPDCCH 300 containing scheduling information. In this case, the machine-type communication device may soft-combine a plurality of EPDCCHs received and perform decoding. Further, the machine-type communication device may receive data 305 using decoded scheduling information. In this case, the data 305 may be repeatedly received.

Figure 4:
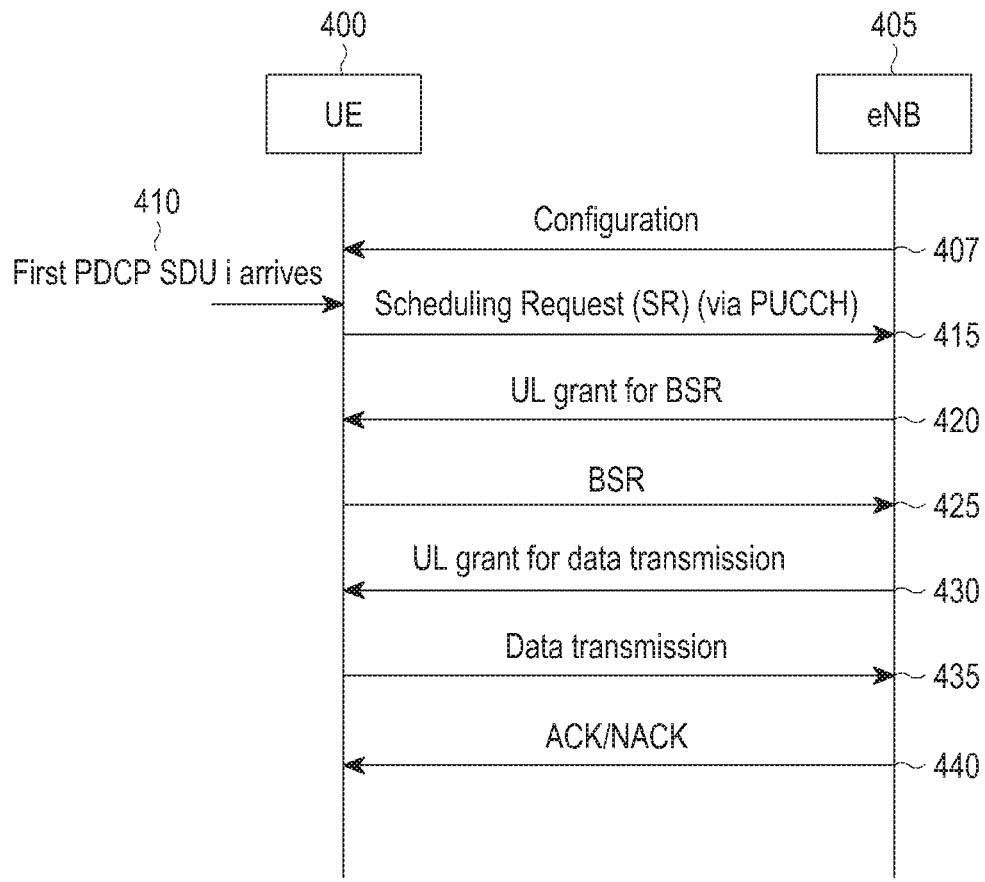
FIG. 4 is a view illustrating a radio resource allocation process according to an embodiment of the present disclosure.

FIG. 4 is a view illustrating a radio resource allocation process according to an embodiment of the present disclosure.

Referring to FIG. 4, the eNB 405 provides configuration information related to a scheduling request (SR) to the UE 400 in operation 407.

The configuration information related to the SR, according to an embodiment of the present disclosure, is described with reference to the following source codes.

| SchedulingRequestConfig information element |
|---|
| ```
-- ASN1START
SchedulingRequestConfig ::=       CHOICE {
    release                       NULL,
    setup                         SEQUENCE {
        sr-PUCCH-ResourceIndex        INTEGER(0..2047),
        sr-ConfigIndex                INTEGER(0..157),
        dsr-TransMax                  ENUMERATED {
                                          n4, n8, n16, n32, n64, spare3, spare2, spare1}
    }
}
SchedulingRequestConfig-v1020 ::=SEQUENCE {
    sr-PUCCH-ResourceIndexP1-r10     INTEGER(0..2047)     OPTIONAL          -
- Need OR
}
-- ASN1STOP
``` |

In the above source codes, schedulingRequestConfig information element(IE) contains the configuration information related to the SR. The UE 400 may transmit an SR to the eNB 405 using SR radio resources periodically allocated. In this case, sr-ConfigIndex of schedulingRequestConfig IE may denote period information and offset that are scheduling information related to the SR radio resource.

Referring to Table 1 below, SR configuration index is a value indicated by the sr-ConfigIndex. As per the SR configuration index value, SR radio resources are allocated to the PUCCH at the period of, minimally, 1 ms, to, maximally, 80 ms, and an offset value may be yielded as per a predetermined equation in the following table.

TABLE 1

SR period and subframe offset configuration information

| SR configuration Index $I_{SR}$ | SR periodicity(ms) $SR_{PERIODICITY}$ | SR subframeoffset $N_{OFFSET, SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |

TABLE 1-continued

SR period and subframe offset configuration information

| SR configuration Index $I_{SR}$ | SR periodicity(ms) $SR_{PERIODICITY}$ | SR subframeoffset $N_{OFFSET, SR}$ |
|---|---|---|
| 155-156 | 2 | $I_{SR} - 155$ |
| 157 | 1 | $I_{SR} - 157$ |

In operation 410, the UE 400 may generate a packet data convergence protocol (PDCP) service data unit (SDU) that should be transmitted. In operation 415, the UE 400 determines whether there is a radio resource for transmitting data. Here, unless there is a radio resource for transmission of data, the UE 400 determines whether an available PUCCH is assigned. When there is no PUCCH, the UE 400 transmits an SR to the eNB 405 using an existing PUCCH. Here, an SR prohibit timer starts. Here, the SR prohibit timer may prevent too frequent transmission of SRs. The SR prohibit timer value may be obtained using an sr-ProhibitTimer IE and SR period transferred through a radio resource control (RRC) message.

According to an embodiment of the present disclosure, the following source codes represent a MAC-MainConfig IE. The IE may be provided to the UE through a RRC message. A look at the Sr-ProhibitTimer-r9 IE contained in the MAC-MainConfig IE reveals that it has a value from 0 to 7. As an example, the SR prohibit timer value may be the product of the SR period and one value from 0 to 7.

MAC-MainConfig information element

```
-- ASN1START
MAC-MainConfig ::=              SEQUENCE {
    ul-SCH-Config               SEQUENCE {
        maxHARQ-Tx                  ENUMERATED {
                                    n1, n2, n3, n4, n5, n6, n7, n8,
                                    n10, n12, n16, n20, n24, n28,
                                    spare2, spare1}           OPTIONAL, -- Need ON
        periodicBSR-Timer           PeriodicBSR-Timer-r12     OPTIONAL, -- Need ON
        retxBSR-Timer               RetxBSR-Timer-r12,
        ttiBundling                 BOOLEAN
    }                                                         OPTIONAL, -- Need ON
    drx-Config                                                OPTIONAL, -- Need ON
    timeAlignmentTimerDedicated     TimeAlignmentTimer,
    phr-Config                      CHOICE {
        release                         NULL,
        setup                           SEQUENCE {
            periodicPHR-Timer               ENUMERATED {sf10, sf20, sf50, sf100,
                                            sf200, sf500, sf1000, infinity},
            prohibitPHR-Timer               ENUMERATED {sf0, sf10, sf20, sf50,
                                            sf100, sf200, sf500, sf1000},
            dl-PathlossChange               ENUMERATED {dB1, dB3, dB6,
                                            infinity}
        }
    }                                                         OPTIONAL, -- Need ON
    ...,
    [[ sr-ProhibitTimer-r9          INTEGER(0..7)             OPTIONAL --
    Need ON
    ]],
    [[ mac-MainConfig-v1020         SEQUENCE {
        sCellDeactivationTimer-r10      ENUMERATED {
                                        rf2, rf4, rf8, rf16, rf32, rf64, rf128,
                                        spare}                OPTIONAL, -- Need OP
        extendedBSR-Sizes-r10           ENUMERATED {setup}    OPTIONAL,
        -- Need OR
        extendedPHR-r10                 ENUMERATED {setup}    OPTIONAL
        -- Need OR
    }                                                         OPTIONAL -- Need ON
    ]],
```

-continued

| MAC-MainConfig information element | | |
|---|---|---|
| [[    stag-ToReleaseList-r11 | STAG-ToReleaseList-r11 | OPTIONAL, -- Need ON |
| stag-ToAddModList-r11 | STAG-ToAddModList-r11 | OPTIONAL, -- Need ON |
| drx-Config-v1130 | DRX-Config-v1130 | OPTIONAL -- Need ON |
| ]], | | |
| [[   e-HARQ-Pattern-r12 | BOOLEAN | OPTIONAL, -- Need ON |
| dualConnectivityPHR CHOICE { release NULL, | | |
|         setup | SEQUENCE { | |
|             phr-ModeOtherCG-r12 | ENUMERATED {real, virtual} | |
|         } | | |
|     } | | OPTIONAL, -- Need ON |
|     logicalChannelSR-Config-r12 | CHOICE { | |
|         release | NULL, | |
|         setup | SEQUENCE { | |
|             logicalChannelSR-ProhibitTimer-r12 | ENUMERATED {sf20, sf40, sf64, sf128, sf512, sf1024, sf2560, spare1} | |
|         } | | |
|     } | | OPTIONAL -- Need ON |
| ]] | | |
| } | | |
| MAC-MainConfigSCell-r11 ::= | SEQUENCE { | |
|     stag-Id-r11 | STAG-Id-r11 | OPTIONAL, -- Need OP |
|     ... | | |
| } | | |
| DRX-Config ::= | CHOICE { | |
|     release | NULL, | |
|     setup | SEQUENCE { | |
|         onDurationTimer | ENUMERATED { psf1, psf2, psf3, psf4, psf5, psf6, psf8, psf10, psf20, psf30, psf40, psf50, psf60, psf80, psf100, psf200}, | |
|         drx-InactivityTimer | ENUMERATED { psf1, psf2, psf3, psf4, psf5, psf6, psf8, psf10, psf20, psf30, psf40, psf50, psf60, psf80, psf100, psf200, psf300, psf500, psf750, psf1280, psf1920, psf2560, psf0-v1020, spare9, spare8, spare7, spare6, spare5, spare4, spare3, spare2, spare1}, | |
|         drx-RetransmissionTimer | ENUMERATED { psf1, psf2, psf4, psf6, psf8, psf16, psf24, psf33}, | |
|         longDRX-CycleStartOffset | CHOICE { | |
|             sf10 | INTEGER(0..9), | |
|             sf20 | INTEGER(0..19), | |
|             sf32 | INTEGER(0..31), | |
|             sf40 | INTEGER(0..39), | |
|             sf64 | INTEGER(0..63), | |
|             sf80 | INTEGER(0..79), | |
|             sf128 | INTEGER(0..127), | |
|             sf160 | INTEGER(0..159), | |
|             sf256 | INTEGER(0..255), | |
|             sf320 | INTEGER(0..319), | |
|             sf512 | INTEGER(0..511), | |
|             sf640 | INTEGER(0..639), | |
|             sf1024 | INTEGER(0..1023), | |
|             sf1280 | INTEGER(0..1279), | |
|             sf2048 | INTEGER(0..2047), | |
|             sf2560 | INTEGER(0..2559) | |
|         }, | | |
|         shortDRX | SEQUENCE { | |
|             shortDRX-Cycle | ENUMERATED { sf2, sf5, sf8, sf10, sf16, sf20, sf32, sf40, sf64, sf80, sf128, sf160, sf256, sf320, sf512, sf640}, | |
|             drxShortCycleTimer | INTEGER(1..16) | |
|         } OPTIONAL | | -- Need OR |
|     } | | |
| } | | |

-continued

MAC-MainConfig information element

```
DRX-Config-v1130 ::=                SEQUENCE {
    drx-RetransmissionTimer-v1130       ENUMERATED {psf0-v1130}             OPTIONAL,
    --Need OR
    longDRX-CycleStartOffset-v1130      CHOICE {
        sf60-v1130                          INTEGER(0..59),
        sf70-v1130                          INTEGER(0..69)
    }                                                                       OPTIONAL,    --Need OR
    shortDRX-Cycle-v1130                ENUMERATED {sf4-v1130}              OPTIONAL
    --Need OR
}
PeriodicBSR-Timer-r12 ::=           ENUMERATED {
                                        sf5, sf10, sf16, sf20, sf32, sf40, sf64, sf80,
                                        sf128, sf160, sf320, sf640, sf1280, sf2560,
                                        infinity, spare1}
RetxBSR-Timer-f12 ::=                   ENUMERATED {
                                        sf320, sf640, sf1280, sf2560, sf5120,
                                        sf10240, spare2, spare1}
STAG-ToReleaseList-r11 ::=SEQUENCE(SIZE(1..maxSTAG-r11)) OF STAG-Id-r11
STAG-ToAddModList-r11 ::= SEQUENCE(SIZE(1..maxSTAG-r11)) OF STAG-
ToAddMod-r11
STAG-ToAddMod-r11 ::=               SEQUENCE {
    stag-Id-r11                         STAG-Id-r11,
    timeAlignmentTimerSTAG-r11 TimeAlignmentTimer,
    ...
}
STAG-Id-r11::=                      INTEGER(1..maxSTAG-r11)
-- ASN1STOP
```

In operation 420, the eNB 405 may schedule a radio resource that may transmit a buffer status report (BSR) to the UE 400. Here, when the UE 400 fails to be scheduled for a radio resource capable of BSR transmission, if the SR prohibit timer expires, an SR may be transmitted again.

Referring to the source codes above, the UE 400 may increase the counter value (e.g., SR_COUNTER) by one at each SR transmission attempt. Here, when a value set as the counter value becomes the same as, e.g., the variable dsr-TransMax, the UE may attempt to randomly access the eNB. As an example, the dsr-TransMax value may be set by the eNB for the UE 400, which may be one of 4, 8, 16, 32, and 64.

Meanwhile, the BSR is used to inform the eNB 405 how much transmit data the UE 400 has. In operation 425, the UE 400 may transmit the BSR using a radio resource allocated. In operation 430, the eNB 405 may allocate a radio resource capable of transmission of PDCP SDU. In operation 435, the UE 400 may transmit data to the eNB 405. In operation 440, the eNB 405 may transmit ACK/NACK information regarding the data.

Figure 5:
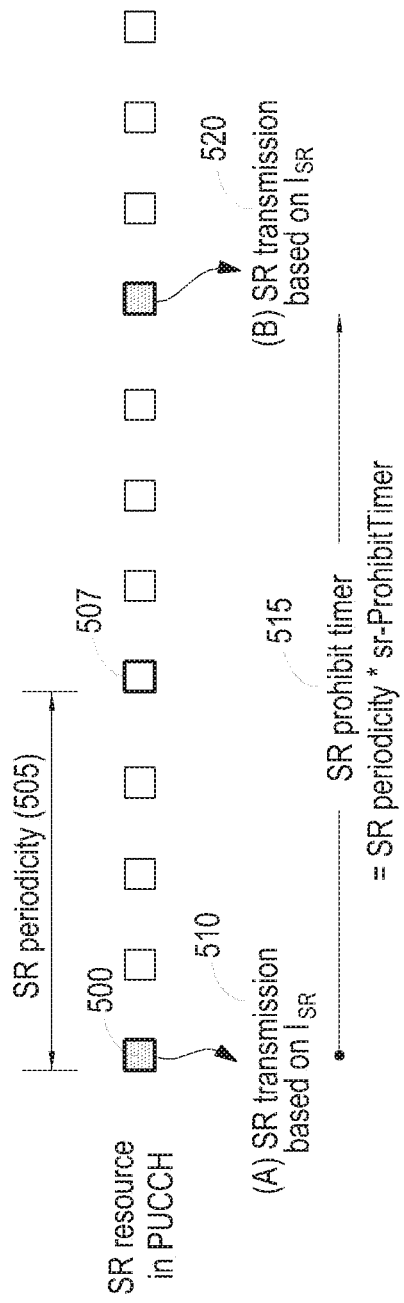
FIG. 5 is a view illustrating an SR transmission according to an embodiment of the present disclosure.

FIG. 5 is a view illustrating an SR transmission according to an embodiment of the present disclosure.

According to an embodiment of the present disclosure, the UE 400 may determine a time and period when the UE 400 may transmit its own SR based on the sr-ConfigIndex of the schedulingRequestConfig IE and value. In this case, SR radio resources 500, 507, and 520 allocated to the UE 400 may be repeatedly allocated at the SR period 505. When the UE 400 transmits an SR using one of the SR radio resources 500, 507, and 520 (510), the UE 400 may drive a first timer, SR prohibit timer. A value of the first timer may be determined as a multiple of the period of SR radio resource (SR periodicity). Further, the multiple (the sr-ProhibitTimer of FIG. 5) may be transmitted through RRC signaling to the UE 400. In this case, the UE 400 may not transmit an SR until the first timer expires. Further, when the first timer expires, the UE 400 may transmit its own SR as necessary (520).

A method for re-transmitting an SR to expand service coverage is described below. Specifically, a method for determining the number of times of SR transmission is proposed, and specific SR transmission-related operations when SRs are repeatedly transmitted are described below.

A most efficient way for expanding communication service coverage of an electronic device is that the transmitter repeatedly transmits data until energy is accrued necessary for the receiver to successfully perform decoding. To that end, SR should also be repeated transmitted. The UE 400 may determine the number of repeated transmissions of SR necessary as per a predetermined rule and may repeatedly transmit SR to the eNB. Methods for determining the number of repeated transmissions of SR are described below in greater detail.

1) Method in which eNB 405 includes the number of repeated SR transmissions in SR configuration information and provides to UE 400.

For expansion of communication service coverage, the eNB 405 includes a repeated SR transmission count in the schedulingRequestConfig IE. The eNB 405 determines another repeated SR transmission count depending on the cell context or predetermined feedback information indicating the quality of uplink signal provided from the UE 400 and sets the same for the UE 400.

2) Method in which eNB 405 broadcasts cell-specific repeated SR transmission count information through a system information block (SIB).

The eNB 405 may broadcast cell-specific repeated SR transmission count information, which may be applicable to all the UEs in its service coverage, through SIBs. The repeated SR transmission count may be determined based on the maximum coverage enhancement (CE) level supportable by the eNB 405.

3) Method in which a fixed repeated SR transmission count applies all the time.

A fixed value may always be used without separate signaling.

4) Method in which a repeated transmission count of M-PDCCH, M-PDSCH, or M-PUSCH applied latest is applied.

For expansion of communication service coverage, the UE 400 may receive repeated transmission count information for a corresponding MTC-physical downlink shared channel (M-PDSCH) or MTC-physical uplink shared channel (M-PUSCH) from the eNB 405 through a MTC-physical downlink control channel (M-PDCCH). The UE 400 may reuse the repeated transmission count information for the M-PDSCH or M-PUSCH received latest to determine a repeated transmission count of SR. In this case, the UE 400 may apply the repeated transmission count of M-PDSCH or M-PUSCH as it is or may add a separate margin thereto and apply the result.

5) Method for deriving a repeated SR transmission count based on the master information block (MIB) or SIB1bis, or a predetermined repeated transmission count of SIB or SR periodicity, or other configuration information.

The UE 400 may derive repeated SR transmission count information utilizing, e.g., the MIB or SIB1bis or a predetermined repeated transmission count of SIB, or SR periodicity information. In this case, the UE 400 may apply the MIB or SIB1bis or predetermined repeated transmission count of SIB, as it is, or may add a separate margin thereto and apply the result.

According to an embodiment of the present disclosure, an SR transmission process by the UE 400 for expanding communication service coverage is described below in connection with a first, second, and third embodiment.

First Embodiment

Figure 6:
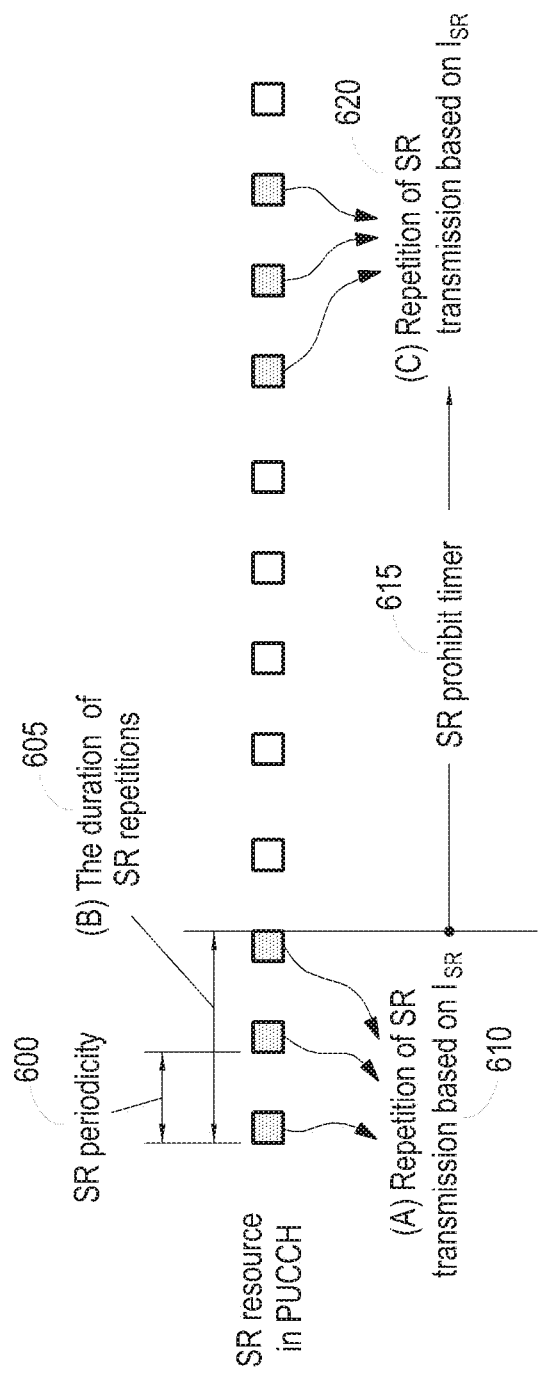
FIG. 6 is a view illustrating an SR transmission according to an embodiment of the present disclosure.

Referring to FIG. 6, the eNB 405 may configure existing SR Config Index information in the schedulingRequestConfig IE to expand communication service coverage. Here, the UE 400 may repeatedly transmit SRs using SR radio resources indicated by the SR Config Index (610). Accordingly, the repeated SR transmission interval 605 may be the same or longer than the SR periodicity 600. Here, in order for the eNB 405 to decode the SRs repeatedly transmitted as soon as possible, it would be preferable to reduce the period (e.g., 1 ms or 2 ms) of SR radio resource indicated by the SR Config Index. When a set of repeated SR transmissions is complete, the UE 400 drives an SR prohibit timer 615. As an example, the SR prohibit timer value may be obtained as the product of the period of SR radio resource and the sr-ProbibitTimer as conventional. As another example, the SR prohibit timer value may be newly derived from the product of a separate sr-ProbibitTimer for a communication service coverage expansion mode and the period of SR radio resource for expanding communication service coverage. The separate sr-ProbibitTimer may also be provided to the UE 400 through RRC signaling. Or, the UE 400 may use an existing sr-ProbibitTimer to reduce signaling overhead. Meanwhile, until before the SR prohibit timer expires, the UE 400 cannot start another set of repeated SR transmissions 620.

Second Embodiment

The second embodiment is the same in SR transmission process as the first embodiment except for the time that the SR prohibit timer operate.

Figure 7:
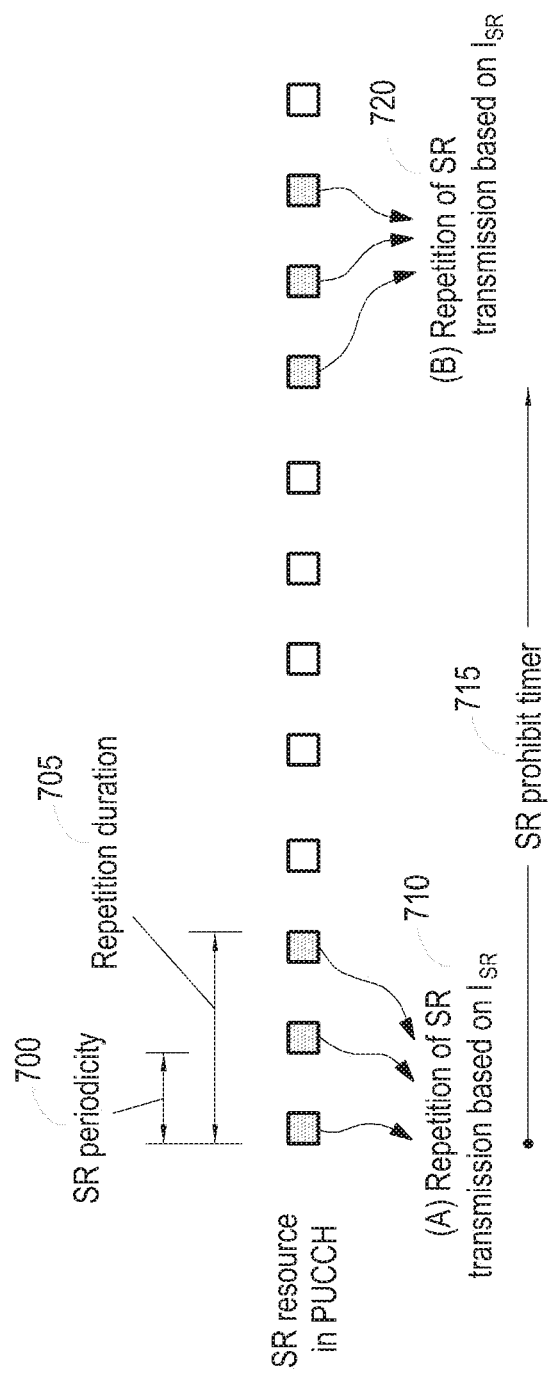
FIG. 7 is a view illustrating an SR transmission according to an embodiment of the present disclosure.

Referring to FIG. 7, the SR prohibit timer may start to operate at the time that a first SR transmission in one set 710 of repeated SR transmissions begins (715). In this case, even while the SR prohibit timer operates, the UE 400 may continue to perform the ongoing repeated SR transmission 710. Here, since the SR prohibit timer should be longer than the time 705 of repeated transmission of SR (e.g., two times the SR periodicity 700), the separate sr-ProhibitTimer IE value should be more than the existing maximum value, i.e., 7. Until before the SR prohibit timer expires, the UE 400 cannot start another set of repeated SR transmissions 720.

Third Embodiment

Figure 8:
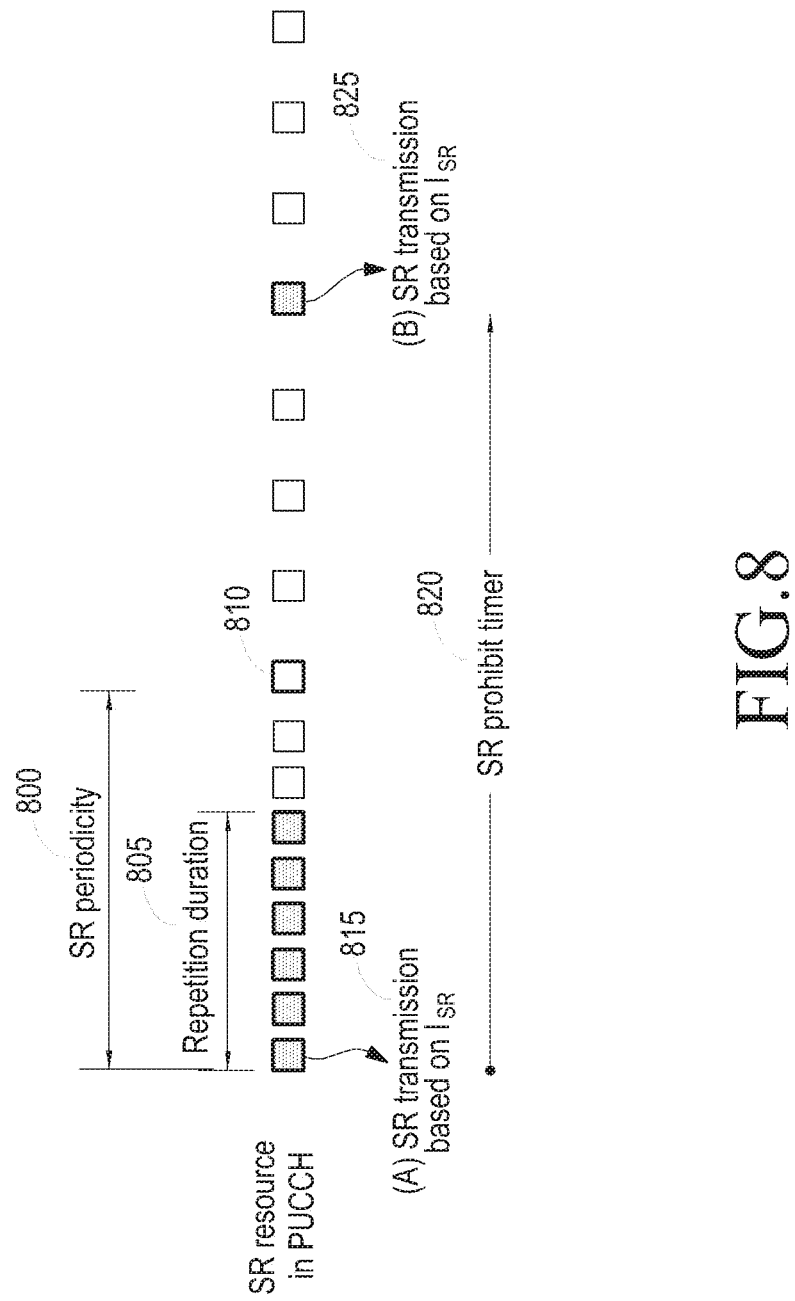
FIG. 8 is a view illustrating an SR transmission according to an embodiment of the present disclosure.

Referring to FIG. 8, the eNB 405 may configure existing SR Config Index information in the schedulingRequestConfig IE applied for expanding communication service coverage. Here, the SR radio resource indicated by the SR Config Index means only the first transmission 815 of the repeated SR transmissions, and the UE 400 may repeatedly transmit SRs according to repeated transmission count information separately signaled. In this case, the SR periodicity 800 may differ from the repeated interval 805 (from reference numeral 815 to reference numeral 810). Further, the eNB 405 may provide a time gap between repeated transmissions to the UE 400 through separate signaling. Further, the UE 400 may determine that the time gap between repeated transmissions is a preset value. In order for the eNB 405 to quickly decode SRs repeatedly transmitted, it would be preferable to reduce the time gap (e.g., 1 ms or 2 ms) between repeated transmissions. Meanwhile, referring to FIG. 8, the SR prohibit timer may start to operate at the time that a first SR transmission in one set of repeated SR transmissions begins. In this case, even while the SR prohibit timer operates, the repeated SR transmissions in progress may continue. The sr-ProbibitTimer may also be provided to the UE 400 through RRC signaling. Or, the UE 400 may reuse an existing sr-ProbibitTimer to reduce signaling overhead. In this case, until before the SR prohibit timer expires, the UE 400 cannot start another set of repeated SR transmissions.

Figure 9:
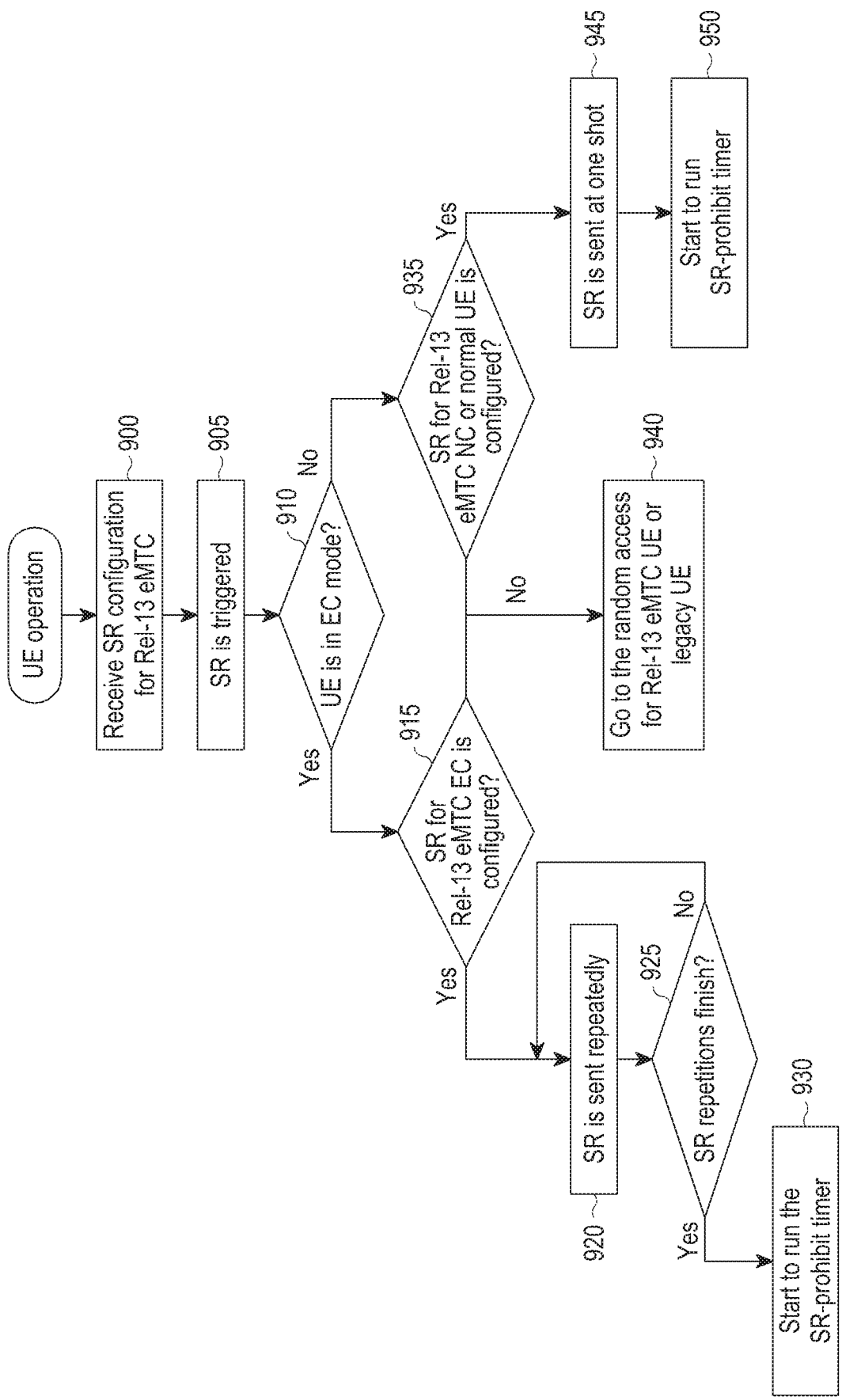
FIG. 9 is a view illustrating operations of a UE according to an embodiment of the present disclosure.

FIG. 9 is a view illustrating operations of a UE according to an embodiment of the present disclosure.

Referring to FIG. 9, an eMTC-enhanced coverage (EC) UE (e.g., Rel-13) may receive a set of multiple pieces of SR configuration information (900). Here, a UE supporting a function of expanding service coverage through repeated transmissions/receptions may determine an EC level depending on signal quality. For example, the UE, although abstaining from repeated transmission when the signal quality is good, may increase repeated transmissions as the signal quality worsens. In this case, a particular repeated transmission count may be quantized into an EC level. Such quantization contributes to efficiency of the communication system. For example, not performing repeated SR transmissions may be denoted as EC level 0, performing five repeated SR transmissions as EC level 1, and performing ten repeated SR transmissions as EC level 2.

Meanwhile, the eNB may separately configure SR configuration information applied when the signal quality is good, and thus, no repeated transmissions are performed and SR configuration information applied when repeated transmissions are performed and may provide the SR control information to the UE. Here, the SR control information applied when repeated transmissions are performed may contain repeated SR transmission count information. Or, one piece of SR control information may be configured, and in this case, configuration information (e.g., repeated SR transmission count information) applied only when repeated transmissions are performed may be defined additionally.

Receiving the set of multiple pieces of SR control information, the UE may select one piece of information from the set depending on the EC level and use the same.

In operation 905, an SR may be triggered.

In operation 910, it is determined whether the UE is in a service coverage expansion mode (EC mode). When the UE is in the EC mode, the UE may determine, in operation 915, whether an SR for the EC mode has been configured. When the SR for the EC mode has been configured, the SR is repeatedly transmitted according to the SR control information in operation 920. In operation 925, it is determined whether the repeated SR transmissions end. When the repeated SR transmissions are determined to end, the UE activates the SR prohibit timer. Unless the repeated SR transmissions are determined not to end, operation 920 is repeated. In operation 915, when no SR for the EC mode has been configured, the UE may proceed with operation 940.

Meanwhile, when the UE is determined in operation 910 not to be in the EC mode, the UE may perform operation 935. As per operation 935, when an SR for a LC mode is configured or the UE is a normal one, the UE may go to operation 945. In operation 945, the SR is transmitted once, and the SR prohibit timer may start. In operation 935, when no SR for the LC mode is configured nor is the UE a normal one, the UE may go to operation 940.

The UE, after repeatedly transmitting the SR, may monitor the MPDCCH to identify whether a UL grant is received from the eNB. In this case, the time of monitoring the MPDCCH for receiving the UL grant may be one of the following:

(1) Upon or after completing the repeated SR transmission. Monitoring M-PDCCH.

(2) Upon or after completing the SR prohibit timer.

Meanwhile, after successfully decoding the repeated SR transmission from the UE, the eNB may transmit a UL grant to the UE through a M-PDCCH. In this case, since the UE is in the connected mode, the eNB assumes that the UE is aware whether it is a NC or EC. Here, the time that the eNB transmits a MPDCCH containing a UL grant may be one of the following:

(1) Include a UL grant in the MPDCCH that first comes after SR decoding succeeds.

(2) Include a UL grant in the MPDCCH that first comes after SR decoding succeeds and a preset repeated SR transmission is complete.

(3) Include a UL grant in the MPDCCH that first comes after SR decoding succeeds and a preset SR prohibit timer expires.

Figure 10:
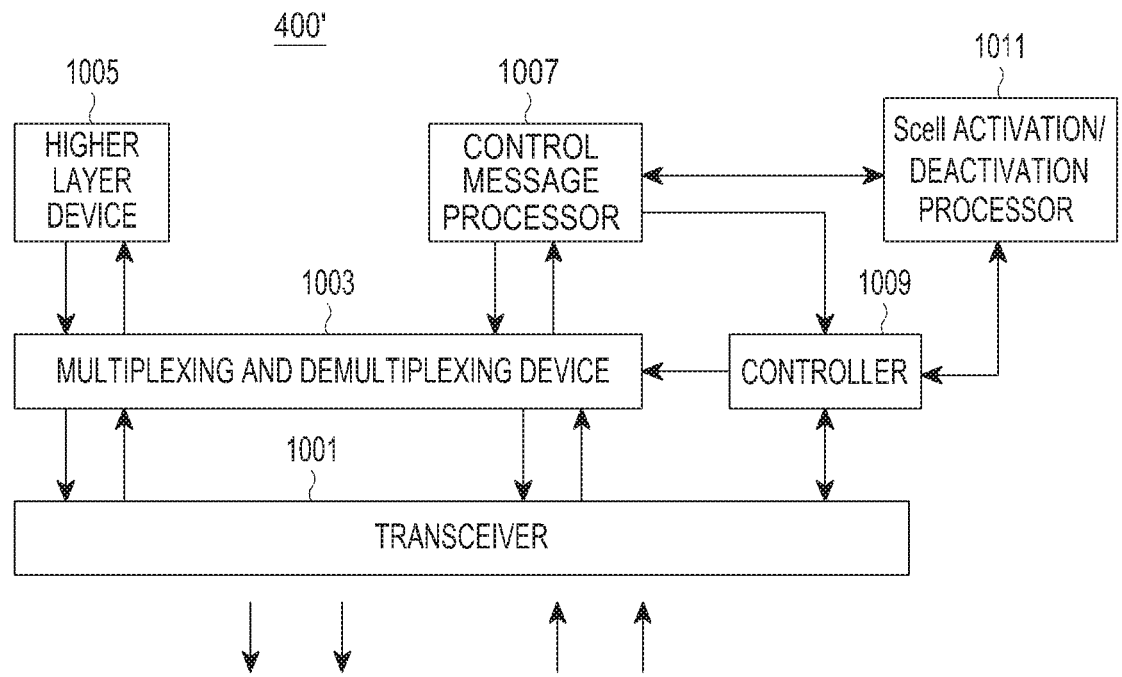
FIG. 10 is a view illustrating a configuration of a UE according to an embodiment of the present disclosure.

FIG. 10 is a view illustrating a configuration of a UE according to an embodiment of the present disclosure.

The UE 400' may include a transceiver 1001, a multiplexing and demultiplexing device 1003, a higher layer device 1005, a control message processor 1007, a controller 1009, and an Scell activation/deactivation processor 1011. Here, the transceiver 1001, the multiplexing and demultiplexing device 1003, the high layer device 1005, the control message processor 1007, the controller 1009, and the Scell activation/deactivation processor 1011 may mutually transmit and receive data signals as shown in FIG. 10.

The controller 1009 overall controls the UE 400'. The controller 1009 may control the transceiver 1001 to receive physical signals. Further, the controller 1009 may control the multiplexing and demultiplexing device 1003 to demultiplex the received physical signals. Further, the controller 1009 may transfer the demultiplexed physical signals to the high layer device 1005 or the control message processor 1007. Further, the controller 1009 may control the multiplexing and demultiplexing device 1003 to receive data signals from the high layer device 1005. Further, the controller 1009 may control the multiplexing and demultiplexing device 1003 and the transceiver 1001 to transmit the received data signals.

The controller 1009 may control the control message processor 1007 to receive an activation/deactivation MAC CE. Further, the controller 1009 may transfer the received activation/deactivation MAC CE to the Scell activation/deactivation processor 1011. The controller 1009 may determine a first time when the Scell activation/deactivation processor 1011 is activated (where, the first time may also be determined by the Scell activation/deactivation processor 1011). Meanwhile, the Scell activation/deactivation processor 1011, when the first time arrives, may instruct at least one of the controller 1009 and the control message processor 1007 to perform operations that they should do at the first time. Upon receiving a command to deactivate the SCell already activated, the controller 1009 may determine a second time (where, the second time may also be determined by the Scell activation/deactivation processor 1011). The Scell activation/deactivation processor 1011 may instruct the controller 1009 and the control message processor 1007 to perform first operations that should be done so before reaching he second time. When the second time arrives, the S cell activation/deactivation processor 1011 may control the controller 1009 and the control message processor 1007 to perform second operations that should be done so at the second time.

According to the above-described embodiments of the present disclosure, a predefined operation may be performed at a predefined time upon activating or deactivating an SCell in a case where carrier aggregation is used, thereby preventing malfunctions and enabling accurate operations.

Meanwhile, when the UE in the LTE system attempts to establish a RRC connection to the eNB, an establishment cause value may be included in a RRC Connection Request message. Here, the cause value may indicate the service that the UE intends to receive by attempting the RRC connection. The eNB may define priority and determine whether to permit access considering, e.g., network congestion, based on the cause value.

Here, when the eNB permits access, the eNB may transmit a RRC Connection Setup message to the UE, or otherwise, it may send a RRC Connection Reject message to the UE. In the following source codes, establishmentCause IE, as a service type, breaks down into, e.g., emergency (e.g., emergency communication), highPriorityAccess (e.g., for public purposes or for service providers only), mt-Access (e.g., access from eNB), mo-Signalling (e.g., for purposes of control signals sent from UE), mo-Data (e.g., for purposes of transmission of data from UE), and delayTolerantAccess (e.g., delay-insensitive access). Here, each variable may indicate a larger service category than detailed services.

EstablishmentCause ::=    ENUMERATED {
                          emergency, highPriorityAccess, mt-Access,
mo-Signalling,mo-Data, delayTolerantAccess-v1020, spare2, spare1}

The service provider puts priority on particular services, e.g., VoLTE, SMS, video call, or CS fallback call. Even desiring to permit access, the UE cannot notify the eNB of this with the cause values differentiated in the current LTE standards. Thus, an attempt to access for the particular services may be known using idle fields, spare 2 and spare 1, of the establishmentCause IE.

This may incur two issues.

One is that, when the particular services are indicated using the idle fields, there might be a legacy eNB unable to appreciate it. The legacy eNB would ignore the idle field value or take it as an error, and this would not be a result intended by the UE. To address this issue, the eNB may previously notify the UEs in the service coverage whether they may appreciate the idle field value using system information.

The other issue is that the two idle fields are insufficient for the service provider to let the cause value correspond to each of three or more particular services.

Now described is a method for the eNB to provide a particular service or service list that the UE may indicate using a particular establishment cause value, using system information, in order to address the two issues above.

The eNB may broadcast particular services or service list information to the UEs in the service coverage using legacy SIBs or new SIBs. When a UE having received the information attempts a RRC connection, if the service the UE desires to receive matches the service provided from the UE or a service of the list, the UE may include a new establishment cause value indicating the same in a RRCConnection Request message. In this case, the eNB may first permit access for the UE attempting the RRC connection along with the new cause value.

Figure 11:
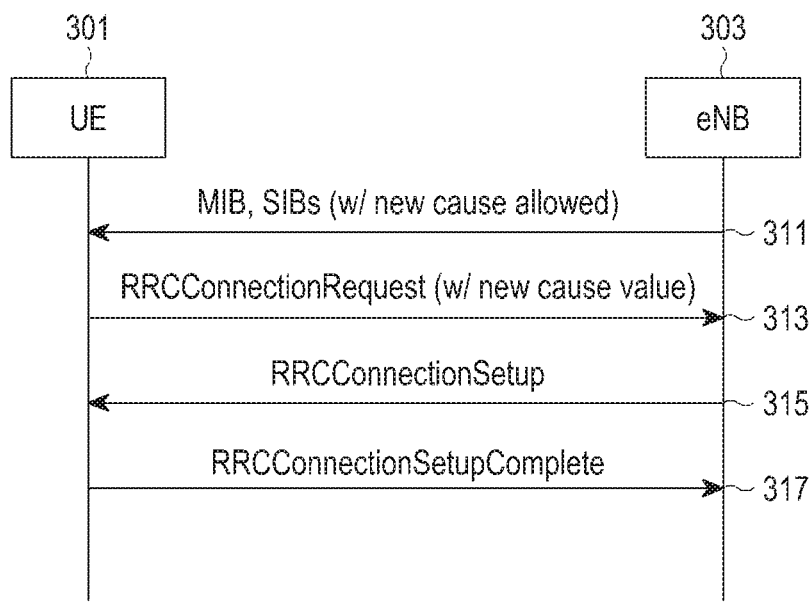
FIG. 11 is a view illustrating a flow of messages between a UE and an eNB according to an embodiment of the present disclosure.

FIG. 11 is a view illustrating a flow of messages between a UE and an eNB according to an embodiment of the present disclosure.

Referring to FIG. 11, when the UE 301 accesses a LTE network to receive a service, e.g., voice over LTE (VoLTE), short message service (SMS), video call, or CS fallback call, the UE 301 and the eNB 303 may communicate messages.

The UE 301, upon entry of the coverage of the eNB (e.g., a LTE eNB) 303, may receive system information broadcast from the eNB (311). Here, the system information may include at least one of a master information block (MIB) and a system information block (SIB). In this case, the SIB may include several SIBs. As an example, the SIB may include an SIB1, an SIB2, and an SIB3, and each SIB may provide a different piece of system information. As such, when there are several types of SIBs, and the eNB 303 may differentiate a particular service, e.g., VoLTE, the eNB 303 may include a first indicator in a predetermined SIB (e.g., SIB2) and send the same. Here, the first indicator may indicate a correlation between at least one of the idle fields, spare 2 and spare 1, of the establishmentCause IE and at least one of the particular services, such as VoLTE, SMS/multimedia messaging service (MMS), video call, and CS fallback call.

An example of a detailed format indicating the correlation is given below.

First Embodiment

When the space 2 idle field of the establishmentCause IEis defined as a new cause value, the eNB 303 may include the detailed format in a predetermined SIB and broadcast the type of service indicated by the new cause value contained in the RRCConnectionRequest message to the UE 301.

additionalCauseValue ENUMERATED {voice, video, sms, voice-video, voice-sms, video-sms, voice-video-sms, spare1} OPTIONAL -- Need OR In this case, the service indicated by the cause value may be a single or multiple services depending on which field is to be selected. For example, when the eNB 303 selects voice (VoLTE), the new cause value of establishmentCause IE may be set when the UE 301 attempts to receive a voice service. When the eNB 303 selects voice-video, the new cause value of establishmentCause IE may be set when the UE 301 attempts to receive a voice or video service.

The need OR conditional equation means that, when the IEis not present, the additionalCausevalue value previously applied is deleted and not applied any longer.

When the two idle fields of establishmentCause IE both are used as the new cause value, the format is present in each idle field.

Second Embodiment

When the space 2 idle field of the establishmentCause IEis defined as a new cause value, the eNB 303 may include the detailed format in a predetermined SIB and broadcast the type of service indicated by the new cause value contained in the RRCConnectionRequest message to the UE 301. In this case, one independent IE corresponds to each type of service and has an ENUMERATED {TRUE} format. For example, the format may be a bitmap format.

additionalCauseValueVoice ENUMERATED {TRUE} OPTIONAL, —Need OR
additionalCauseValueVideo ENUMERATE {TRUE} OPTIONAL, —Need OR
additionalCauseValueSMS ENUMERATED {TRUE} OPTIONAL—Need OR In this case, the service indicated by the cause value may be a single or multiple services depending on which field is to be selected. For example, when the eNB 303 sets the additionalCausevalueVoice IE as TRUE, the new cause value of establishmentCause IE may be set when the UE 301 attempts to receive a voice service. When the eNB 303 sets the additionalCauseValueVoice IE and the additionalCauseValueVideo as TRUE, the new cause value of establishmentCause IE may be set when the UE 301 attempts to receive a voice or video service.

Here, when the two idle fields of establishmentCause IE both are used as the new cause value, the format may be present in each idle field.

Third Embodiment

When the space 2 idle field of the establishmentCause IEis defined as a new cause value, the eNB 303 may include the detailed format in a predetermined SIB and broadcast the type of service indicated by the new cause value contained in the RRCConnectionRequest message to the UE 301. In this case, one independent IE corresponds to each type of service and may have an ENUMERATED {TRUE} format. Here, the format may be a typical bitmap format.

additionalCauseValue BIT STRING(SIZE(X))

Here, X is the total number of services or service combinations. The service or service combination corresponding to each bit may be specified in the procedural text or field description. For example, the first bit, second bit, and third bit, respectively, may mean voice, video, and SMS.

Here, the service indicated by the cause value may be a single or multiple services depending on which field is to be selected. For example, when the eNB 303 sets the first bit of the additionalCausevalueVoice IE as 1, the new cause value of establishmentCause IE may be set when the UE attempts to receive a voice service. When the eNB 303 sets the first and second bit of additionalCauseValueVoice IE as 1, the new cause value of establishmentCause IE may be set when the UE 301 attempts to receive a voice or video service.

When the two idle fields of establishmentCause IE both are used as the new cause value, the format may be present in each idle field.

Accordingly, when the UE 301 may distinctively let the LTE network know a particular service, it may be identified whether the first indicator is contained in a predetermined SIB. When the first indicator is contained in a predetermined SIB, and the UE 301 establishes a connection for a service, e.g., VoLTE, the UE 301 may set the EstablishmentCause value as a second or third value (specificServiceAccess1 or specificServiceAccess2) upon transmitting a RRCConnectionRequest message of a radio resource control (RRC) layer which is a layer in charge of control between the UE 301 and the eNB 303. According to an embodiment of the present disclosure, the second value or third value may be added (313).

The following is a detailed format of the RRCConnectionRequest message used herein.

For example, the eNB 303 may indicate, through a particular SIB, that the new specificServiceAccess1 field of the establishmentCause IE corresponds to VoLTE, and the new specificServiceAccess2 field of the establishmentCause IE corresponds to SMS. When the UE 301 attempts to access for VoLTE, the UE 301 may transmit, to the eNB 303, a RRCConnectionRequest message having the specificServiceAccess1 field of establishmentCause IE set. Although an example has been introduced where the idle fields, spare 1 and spare 2, of the establishmentCause IE, all, are used as a cause value for a particular service, an example in which the spare 2 field alone is used as a new cause value while the spare 1 field remains an idle field also belongs to the scope of the present disclosure.

VoLTE, from another through the above-described procedure. Further, upon attempting to access the LTE network, the UE 301 may notify the LTE network of the access attempt to assist the LTE network in determining whether to permit the access.

Figure 12:
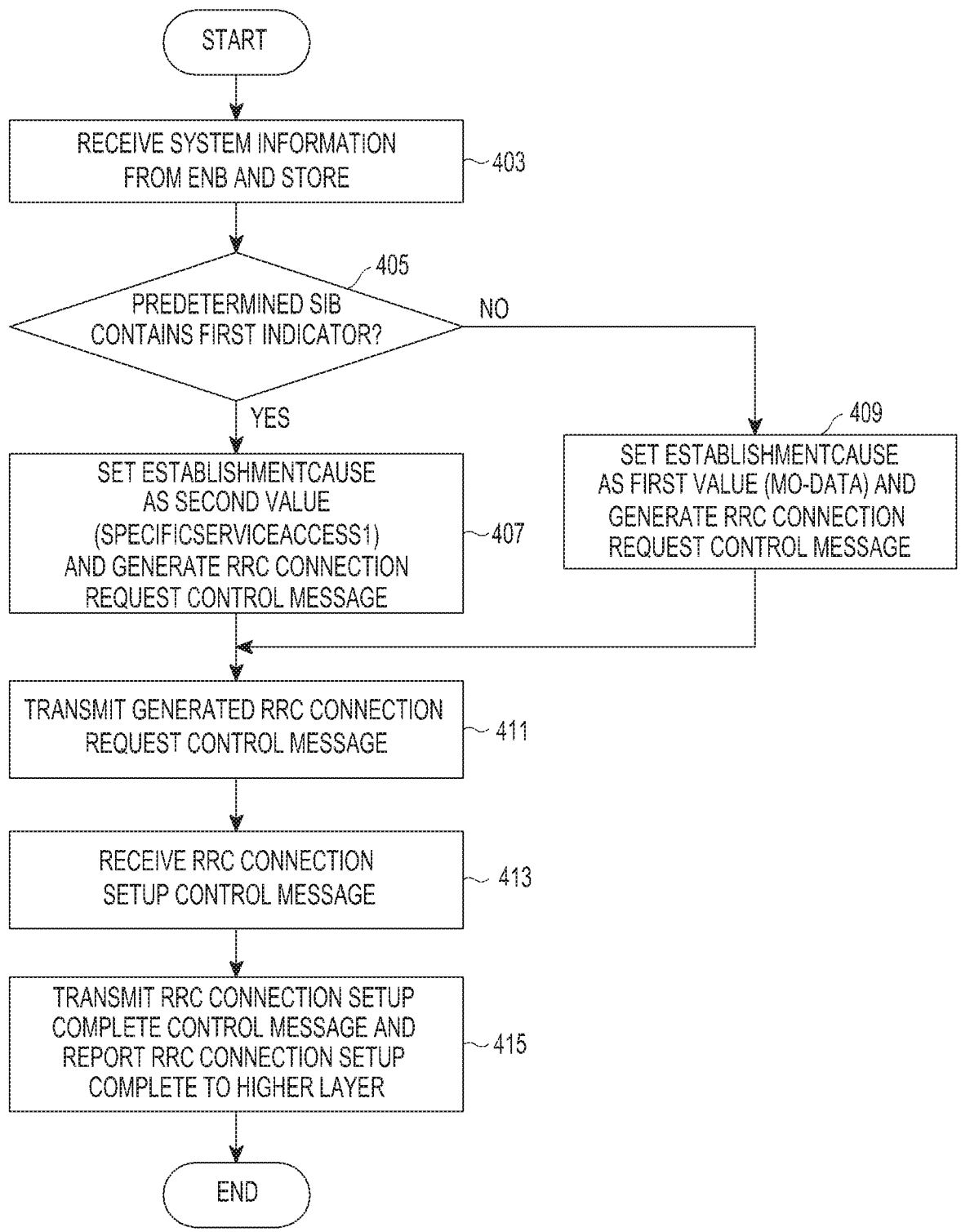
FIG. 12 is a flowchart sequentially illustrating operations of a UE according to an embodiment of the present disclosure.

FIG. 12 is a flowchart sequentially illustrating operations of a UE according to an embodiment of the present disclosure.

Referring to FIG. 12, the UE 301 may access a LTE network for a particular service, e.g., VoLTE. First, the UE 301 may receive system information from the eNB 303, store the received system information, and grasp information about the corresponding cell (403). Here, the UE 301 may identify whether a predetermined SIB (e.g., SIB2) contains the first indicator (e.g., an indicator to permit use of the VoIP cause value) (405). Here, the predetermined service may be a voice over IP (VoIP). Further, upon attempting to access the eNB 303 for a VoLTE service, if the predetermined SIB contains the first indicator, the UE 301 may set the EstablishmentCause value as a second value (e.g., specificServiceAccess1) and generate a RRC connection request control message (407). In contrast, when the UE 301 accesses the eNB for a service other than the VoLTE service, or when the UE 301 tries to access for the VoLTE service but the eNB does not have the first indicator, the UE 301 may set the EstablishmentCause value as 1 (e.g., mo-Data) and generate a RRC connection request control message (409). Thereafter, the UE 301 may send the generated RRC connection request control message to the eNB 303 (411). In response, the UE 301 may then receive a RRC connection setup control message from the eNB 303 (413). Upon receiving the RRC connection setup control message, the

| RRCConnectionRequest message |
|---|
| -- ASN1START |
| RRCConnectionRecquest ::=         SEQUENCE { |
|     criticalExtensions                    CHOICE { |
|         rrcConnectionRequest-r8               RRCConnectionRequest-r8-IEs, |
|         criticalExtensionsFuture              SEQUENCE { } |
|     } |
| } |
| RRCConnectionRequest-r8-IEs ::=   SEQUENCE { |
|     ue-Identity                          InitialUE-Identity, |
|     establishmentCause                   EstablishmentCause, |
|     spare                                BIT STRING(SIZE(1)) |
| } |
| InitialUE-Identity ::=            CHOICE { |
|     s-TMSI                               S-TMSI, |
|     randomValue                          BIT STRING(SIZE(40)) |
| } |
| EstablishmentCause ::=            ENUMERATED { |
|                                       emergency, highPriorityAccess, mt-Access, mo- |
| Signalling, |
|                                       mo-Data, delayTolerantAccess-v1020, |
| ~~spare2~~ specificServiceAccess1, ~~spare1~~ specificServiceAccess2} |
| -- ASN1STOP |

The eNB 303 having rescuered the RRCConnectionRequest message may identify the connection cause value contained in the message to determine whether to permit the UE 301 to connect. When the eNB 303 determines to permit the UE 301 to connect, the eNB 303 may send a command to set up a connection to the UE 301 (313). In this case, the command may be transmitted through a RRC layer's RRCConnectionSetup message. When receiving the message, the UE 301 sends an acknowledge message responsive to the setup message. The acknowledge message may be transmitted through a RRCConnectionSetupComplete message (317). The UE 301 may distinguish a particular service, e.g., UE 301 may send a RRC connection setup complete control message, as an acknowledge message, to the eNB 303 and reports to a higher layer that the RRC connection setup has been complete (415), terminating the connection setup.

Figure 13:
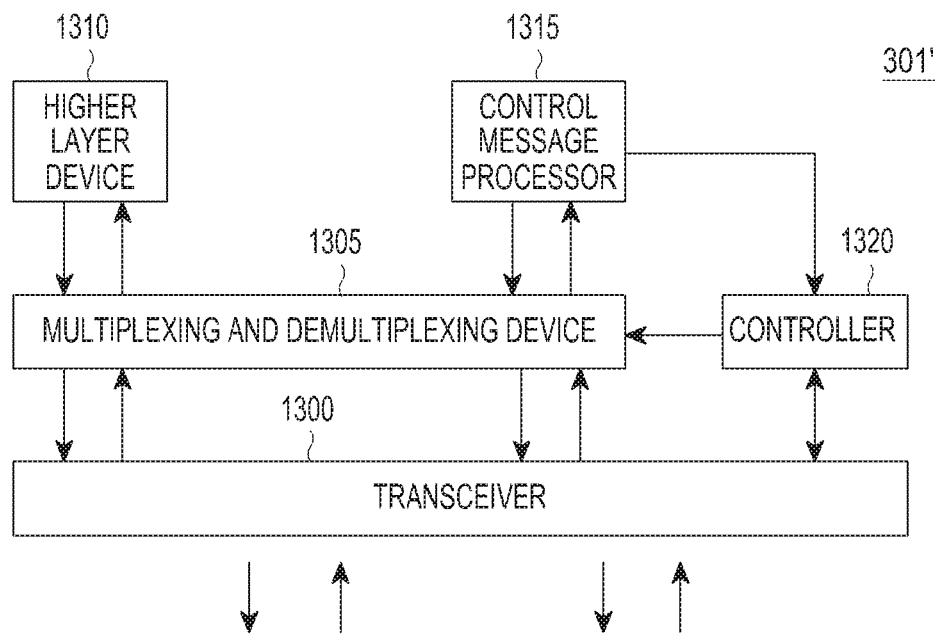
FIG. 13 is a view illustrating a configuration of a UE according to an embodiment of the present disclosure.

FIG. 13 is a view illustrating a configuration of a UE according to an embodiment of the present disclosure.

Referring to FIG. 13, the UE may include a transceiver 1300, a multiplexing and demultiplexing device 1305, a higher layer device 1310, a control message processor 1315, and a controller 1320.

The controller 1320 overall controls the UE. Specifically, the controller 1320 may control the transceiver 1300 to receive physical signals. The controller 1320 may control the multiplexing and demultiplexing device 1305 (or a demultiplexing device) to demultiplex the received physical signals. The controller 1320 may transfer the demultiplexed physical signals to the higher layer device 1310 or control message processor 1315 according to information contained in the demultiplexed physical signals. Meanwhile, the controller 1320 may transmit or receive data from the higher layer device 1310 and transmit or receive control messages through the control message processor 1315. Further, the controller 1320 may control the multiplexing and demultiplexing device 1305 (or a multiplexing device) and transceiver 1300 to send control signals or data to the eNB.

Figure 14:
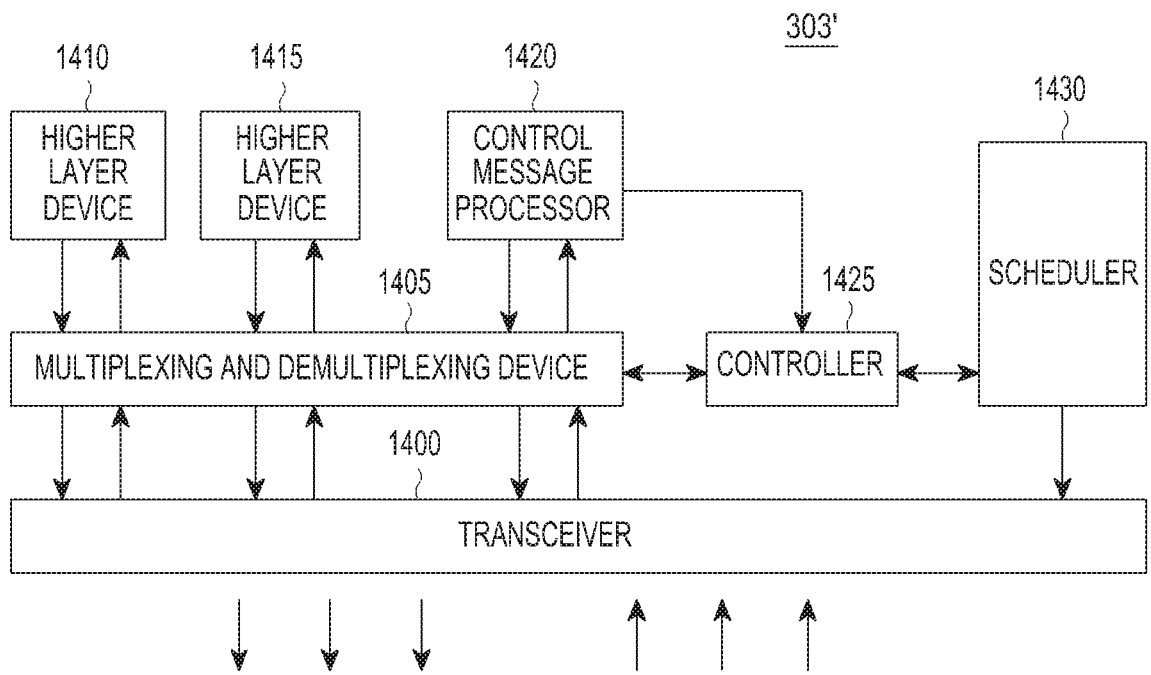
FIG. 14 is a view illustrating a configuration of an eNB according to an embodiment of the present disclosure.

FIG. 14 is a view illustrating a configuration of an eNB according to an embodiment of the present disclosure.

Referring to FIG. 14, the eNB 303' may include a transceiver 1400, a multiplexing and demultiplexing device 1405, a plurality of higher layer devices 1410 and 1415, a control message processor 1420, a controller 1425, and a scheduler 1430.

The transceiver 1400 may transmit data and a predetermined control signal through a forward carrier and receive data and a predetermined control signal through a backward carrier. When multiple carriers are configured, the transceiver 1400 may conduct communication of data and control signals through the multiple carriers.

The multiplexing and demultiplexing device 1405 may multiplex data generated by the higher layer devices 1410 and 1415 or the control message processor 1420 or may demultiplex data received from the transceiver 1400. In this case, the multiplexing and demultiplexing device 1405 may deliver the demultiplexed data to at least one of the higher layer devices 1410 and 1415 and the control message processor 1420.

The controller 1425 overall controls the eNB 303'. Specifically, the controller 1425 may determine a UE to which to apply a band-specific measurement gap. Further, the controller 1425 may determine whether to include such configuration information in a RRCConnectionReconfiguration message.

The control message processor 1420 may generate a RRCConnectionReconfiguration, which is to be transferred to the UE, and transfer the generated RRCConnectionReconfiguration to a higher layer under the control of the controller 1420.

The plurality of higher layer devices 1410 and 1415 may be configured per UE or per service. The plurality of higher layer devices 1410 and 1415 may process data generated from a user service, such as FTP or VoIP, and transfer the data to the multiplexing and demultiplexing device 1405 or may process data delivered from the plurality of higher layer devices 1410 and 1415 and transfer the data to a service application of a higher layer.

The scheduler 1430 may allocate a transmission resource to the UE at a proper time given, e.g., the UE's buffer status, channel status, and the UE's active time. The scheduler 1430 may process signals transmitted from the UE or may control the transceiver 1400 to send signals to the UE.

In the embodiments set forth above, the controller may mean a generic-purpose processor. The processor may include one or more of a central processing unit (CPU), an application processor (AP), a communication processor (CP), or an image signal processor (ISP). The processor may, e.g., perform control on at least one of the other components of the electronic device or image signal processing and/or communication-related operation or data processing.

Although the UE and the eNB have been described as performing the operations in the above-described embodiments, embodiments of the present disclosure are not limited thereto. It should be appreciated that all of the operations performed by the UE and the eNB may also be carried out by the controllers or other components in the UE and the eNB.

Figure 15:
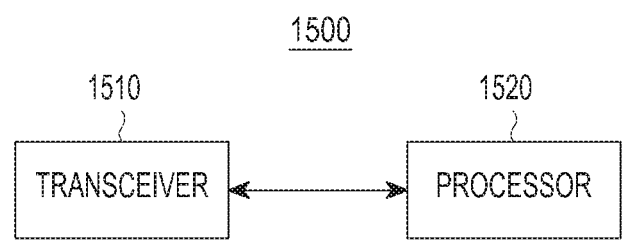
FIG. 15 is a block diagram illustrating a UE according to an embodiment of the present disclosure.

FIG. 15 is a block diagram illustrating a UE according to an embodiment of the present disclosure.

Referring to FIG. 15, the UE 1500 may include a transceiver 1510 and a processor 1520.

The transceiver 1510 may receive configuration information related to transmission of an SR from an eNB.

The processor 1520 may determine a timer value for prohibiting SR transmission based on the received configuration information and control the transceiver to send a set of SRs. In this case, the timer may start at the time of transmission of a first SR of the SR set.

Further, the processor 1520 may increase the counter at each set of SRs transmitted.

Here, the dsr-TransMax of the counter may be included in a SchedulingRequestConfig and be received.

In this case, the timer value may be determined based on the sr-ProhibitTimer received included in the MAC-MainConfig.

Further, the timer value may be determined to be the product of the sr-ProhibitTimer value and the SR transmission periodicity.

Further, the timer value may be the same or larger than the time when the set is transmitted.

Meanwhile, a set other than the above set may be transmitted after the timer value elapses.

Figure 16:
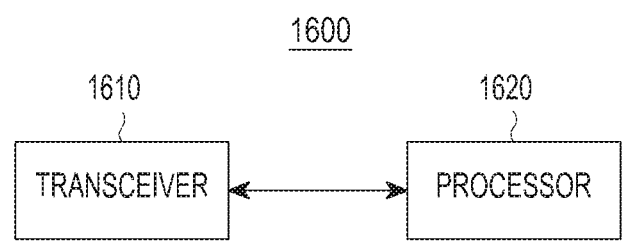
FIG. 16 is a block diagram illustrating an eNB according to an embodiment of the present disclosure.

FIG. 16 is a block diagram illustrating an eNB according to an embodiment of the present disclosure.

Referring to FIG. 16, the eNB 1600 may include a transceiver 1610 and a processor 1620.

The transceiver 1610 may transmit configuration information related to an SR transmission to a UE.

The processor 1620 may determine a timer value for prohibiting SR transmission and control the transceiver 1610 to receive a set of SRs. In this case, the timer may start at the time of transmission of a first SR of the SR set.

Figure 17:
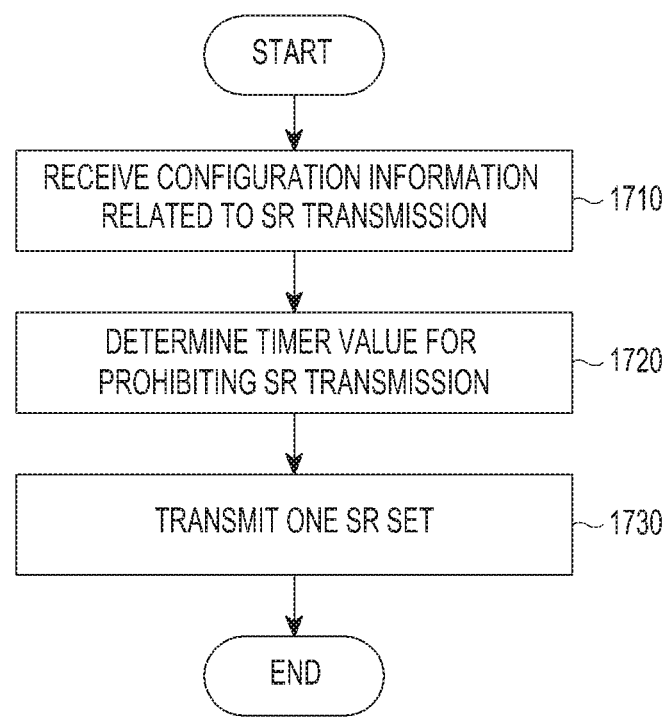
FIG. 17 is a flowchart illustrating a method for transmitting a scheduling request according to an embodiment of the present disclosure.

FIG. 17 is a flowchart illustrating a method for transmitting a scheduling request according to an embodiment of the present disclosure.

First, the method for sending a scheduling request may receive configuration information related to transmission of an SR from an eNB (1710), determine a timer value for prohibiting the SR transmission based on the received configuration information (1720), and send a set of SRs (1730). In this case, the timer may start at the time of transmission of a first SR of the SR set.

Further, the method for sending a scheduling request may further include increasing the counter at each SR set transmitted.

Here, the dsr-TransMax of the counter may be included in a SchedulingRequestConfig and be received.

In this case, the timer value may be determined based on the sr-ProhibitTimer received included in the MAC-MainConfig.

Further, the timer value may be determined to be the product of the sr-ProhibitTimer value and the SR transmission periodicity.

Further, the timer value may be the same or larger than the time when the set is transmitted.

In this case, a set other than the above set may be transmitted after the timer value elapses.

Meanwhile, the methods set forth above in connection with various embodiments of the present disclosure may be implemented in program codes executable on a computer and stored in various non-transitory computer readable media to be run by a processor that may be provided to each server or device.

As an example, there may be provided a non-transitory computer readable medium storing a program performing the operations of receiving configuration information related to transmission of an SR, determining a timer value for prohibiting an SR transmission based on the received configuration information, and transmitting a set of SRs. Here, the timer may start at the time of transmission of a first SR of the SR set.

The non-transitory computer readable medium means a medium readable by a machine and semi-permanently storing data, as well as a medium storing data for a short time, such as registers, cash, and memories. Specifically, the above-described various applications or programs may be stored and provided in a non-transitory computer readable medium, such as a CD, DVD, hard disk, Blu ray disk, USB, memory memory card, and ROM.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A method for transmitting a scheduling request (SR) by a user equipment (UE) in a cellular communication system, the method comprising:
   receiving first configuration information related to an SR transmission and second configuration information related to repeated SR transmissions in a coverage enhanced mode of the UE from an enhanced node B (eNB);
   determining a value of a timer for prohibiting an SR transmission based on the first configuration information and a number of repetitions based on the second configuration information; and
   repeatedly transmitting a set of repeated SRs based on the number of repetitions,
   wherein the timer for prohibiting the SR transmission starts at a time of transmitting a first SR among the set of repeated SRs,
   wherein the UE continues to perform the ongoing transmission of the first SR among the set of repeated SRs while the timer is running, and
   wherein the value of the timer for prohibiting the SR transmission is determined based on a parameter that is received in the first configuration information and a transmission period of the SR.

2. The method of claim 1, further comprising increasing a counter value at each transmitted set of repeated SRs.

3. The method of claim 2, wherein a maximum number of the counter value is received in the first configuration information.

4. The method of claim 1, wherein the value of the timer for prohibiting the SR transmission is determined to be a product of a value of the parameter and the transmission period of the SR.

5. The method of claim 1,
   wherein the value of the timer for prohibiting the SR transmission is larger than a length of a time duration in which the set of repeated SRs is transmitted,
   wherein the set comprises the repeated SRs with the number of repetitions,
   wherein the first configuration information are comprised in a MAC-MainConfig element, and
   wherein the second configuration information are comprised in one of a schedulingRequestConfigIE, a system information block (SIB), or a master information block (MIB).

6. The method of claim 1, wherein another set of repeated SRs is transmitted after the value of the timer for prohibiting the SR transmission elapses.

7. A user equipment (UE) transmitting a scheduling request (SR) in a cellular communication system, the UE comprising:
   a transceiver configured to:
      receive first configuration information related to an SR transmission and second configuration information related to repeated SR transmissions in a coverage enhanced mode of the UE from an enhanced node B (eNB); and
   a processor configured to:
      determine a value of a timer for prohibiting an SR transmission based on the first configuration information and a number of repetitions based on the second configuration information, and
      control the transceiver to repeatedly transmit a set of repeated SRs based on the number of repetition,
   wherein the timer for prohibiting the SR transmission starts at a time of transmitting a first SR among the set of repeated SRs,
   wherein the UE continues to perform the ongoing transmission of the first SR among the set of repeated SRs while the timer is running, and
   wherein the value of the timer for prohibiting the SR transmission is determined based on a parameter that is received in the first configuration information and a transmission period of the SR.

8. The UE of claim 7, wherein the processor is further configured to increase a counter value at each transmitted set of repeated SRs.

9. The UE of claim 8, wherein a maximum number of the counter value is received in the first configuration information.

10. The UE of claim 7, wherein the value of the timer for prohibiting the SR transmission is determined to be a product of a value of the parameter and the transmission period of the SR.

11. The UE of claim 7, wherein the value of the timer for prohibiting the SR transmission is equal or larger than a length of a time duration in which the set of repeated SRs is transmitted.

12. The UE of claim 7, wherein another set of repeated SRs is transmitted after the value of the timer for prohibiting the SR transmission elapses.

13. A method for receiving a scheduling request (SR) by an enhanced node B (eNB) in a cellular communication system, the method comprising:
   transmitting first configuration information related to an SR transmission and second configuration information related to repeated SR transmissions in a coverage enhanced mode of a user equipment (UE) to the UE;
   determining a value of a timer for prohibiting an SR transmission based on the first configuration information and a number of repetitions based on the second configuration information; and
   repeatedly receiving a set of repeated SRs, wherein the timer for prohibiting the SR transmission starts at a time of transmitting a first SR among the set of repeated SRs, wherein the UE continues to perform the ongoing transmission of the first SR among the set of repeated SRs while the timer is running, and wherein the value of the timer for prohibiting the SR transmission is determined based on a parameter that is received in the first configuration information and a transmission period of the SR.

14. The method of claim 13, further comprising increasing a counter value at each transmitted set of repeated SRs.

15. The method of claim 14, wherein a maximum number of the counter value is transferred in the first configuration information.

16. The method of claim 13, wherein the value of the timer for prohibiting the SR transmission is determined to be a product of a value of the parameter and the transmission period of the SR.

17. The method of claim 13, wherein another set of repeated SRs is transmitted after the value of the timer for prohibiting the SR transmission elapses.

* * * * *